(No Model.) 2 Sheets—Sheet 1.

G. H. HEDGE.
THREAD OR TWINE HOLDER.

No. 542,220. Patented July 2, 1895.

Witnesses.
A. C. Harmon
Edward F. Allen

Inventor:
George H. Hedge
by Crosby & Gregory
attys.

(No Model.) 2 Sheets—Sheet 2.
G. H. HEDGE.
THREAD OR TWINE HOLDER.
No. 542,220. Patented July 2, 1895.
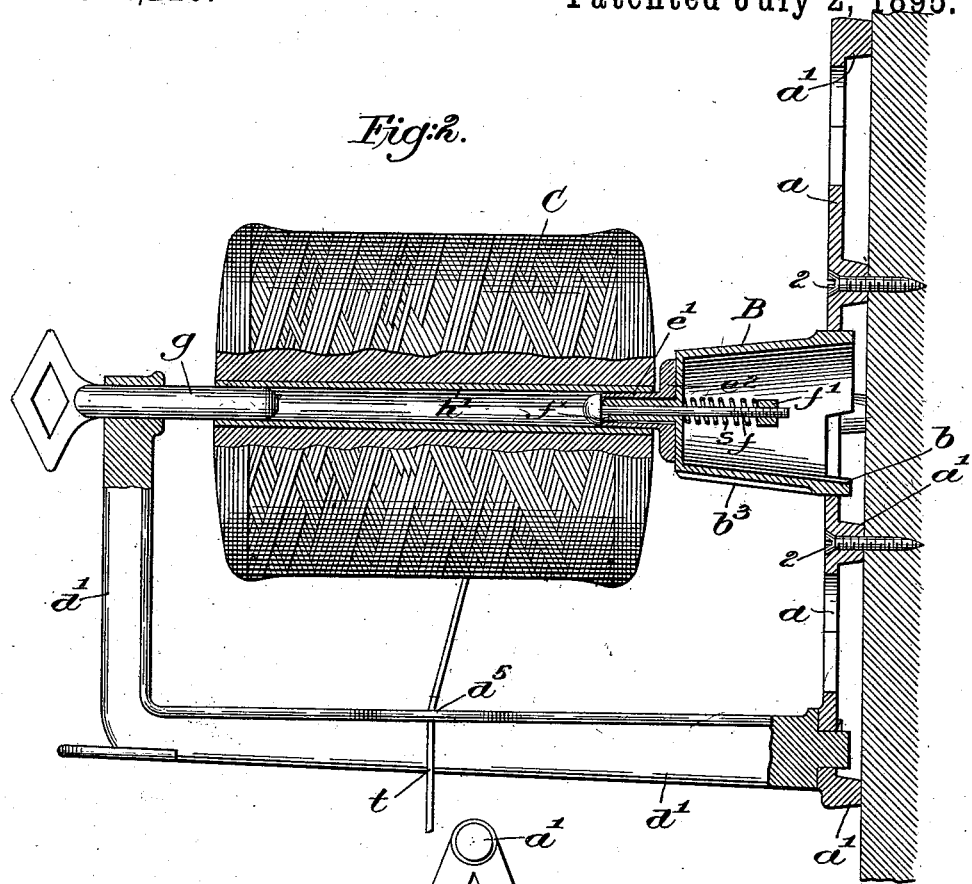
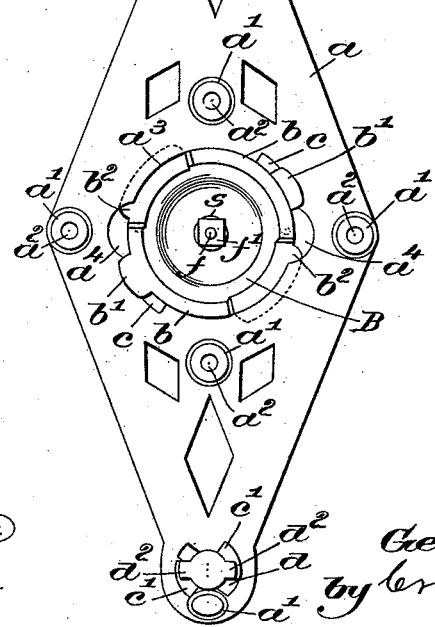
Witnesses.
A. C. Harmon
Edward F. Allen
Inventor
George H. Hedge
by Crosby & Gregory
attys.

UNITED STATES PATENT OFFICE.

GEORGE H. HEDGE, OF NEW BEDFORD, ASSIGNOR TO THE WESTPORT MANUFACTURING COMPANY, OF WESTPORT, MASSACHUSETTS.

THREAD OR TWINE HOLDER.

SPECIFICATION forming part of Letters Patent No. 542,220, dated July 2, 1895.

Application filed August 2, 1894. Serial No. 519,245. (No model.)

*To all whom it may concern:*

Be it known that I, GEORGE H. HEDGE, of New Bedford, county of Bristol, State of Massachusetts, have invented an Improvement in Thread or Twine Holders, of which the following description, in connection with the accompanying drawings, is a specification, like letters on the drawings representing like parts.

This invention has for its object the production of a strong and simple device to hold thread or twine and enable the same to be drawn off easily and without snarling, whether the mass of thread or twine is of conical or cylindrical shape.

Large masses of thread or twine are now put up on cylindrical or conical shells of paper or other light material, and by my invention either form may be held to be unwound with equal facility.

While the twine or thread is readily given off from a conical mass without rotation thereof, it is frequently desirable that a cylindrical mass be rotated as its thread or twine is drawn off, and I have provided means whereby such rotation of the mass may be regulated and retrograde movement prevented.

My improved thread or twine holder consists, essentially, of a base-plate adapted to be secured to a fixed support, a detachable shell-holder mounted on said base-plate and provided with a hub, a sleeve rotatable on the hub, a headed spring-controlled bolt extended through the hub and adapted to bear upon the sleeve to regulate its rotation, and an overhanging arm on the base-plate provided with guide-eyes, subtantially as will be described.

Figure 1:
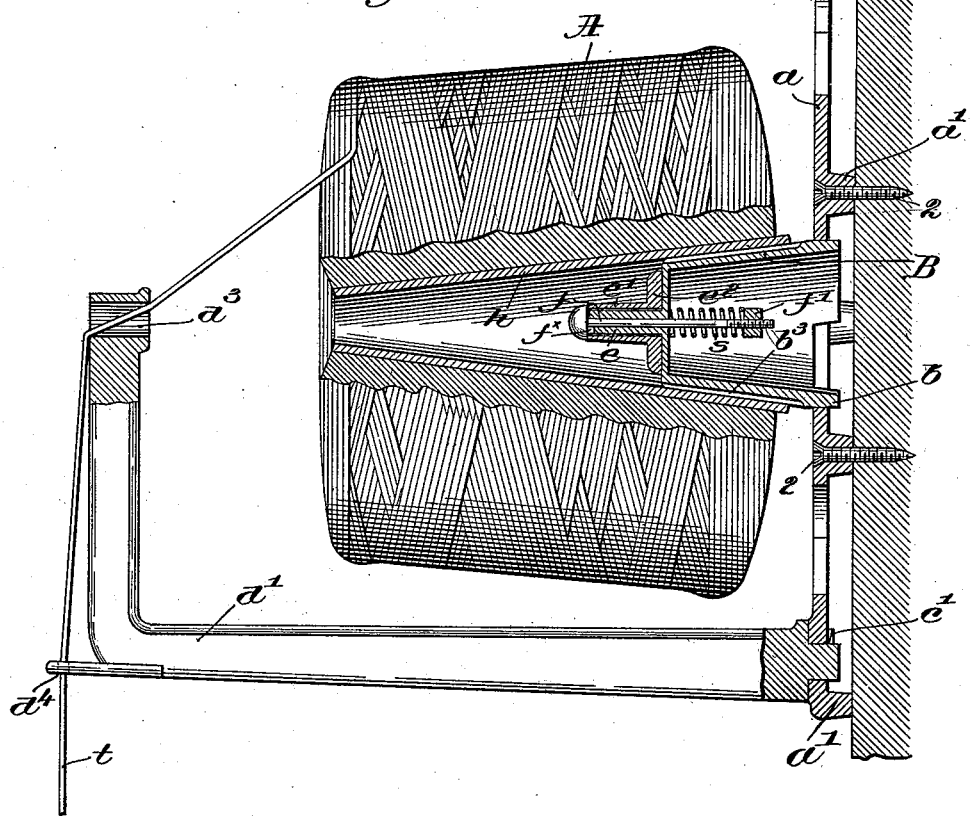
Figure 4:
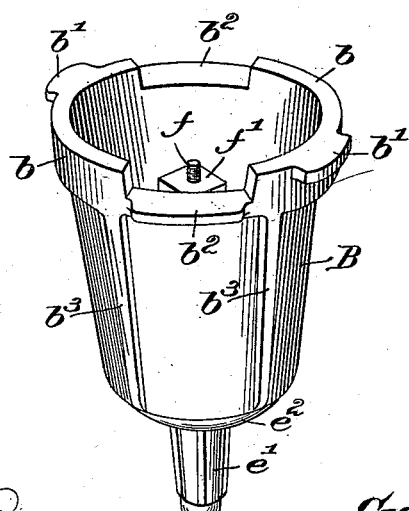

Figure 1 represents in section and partial side elevation a twine-holder embodying my invention suspended from a wall or other fixed support with a conical mass of thread or twine in position to be unwound. Fig. 2 is a similar view of my improved twine-holder with a cylindrical mass of twine mounted thereon to rotate as unwound. Fig. 3 is an under side view of the base-plate with the shell-holder and arm in place, and Fig. 4 is a perspective view of the shell-holder detached.

A base-plate $a$, preferably of cast metal, is provided at its under side with lugs or feet $a'$ to rest on the wall or other fixed support to which the plate is secured and maintain it a slight distance therefrom, as shown in Figs. 1 and 2. Suitable holes $a^3$ are made in the base-plate, and preferably through the lugs $a'$, to receive fastenings, as screws 2, to secure the holder in place. A circular opening $a^3$ (see Fig. 3) is made in the base-plate to receive the base $b$ of the removable shell-holder B, having one or more outwardly-projecting ears $b'$, adapted to pass through enlargements $a^4$ of the opening $a^3$ when registering therewith.

Flanges $b^2$ are located upon the base of the shell-holder above and preferably between the ears $b'$, as best shown in Fig. 3, the distance between the said ears and flanges being slightly greater than the thickness of the base-plate $a$.

The shell-holder B is shown as hollow and tapering from its base to its top, and preferably it is provided with longitudinal external ribs $b^3$.

The ears $b'$ bear upon cam-surfaces $c$ on the under side of the base-plate, when the base of the shell-holder is inserted in the opening $a^3$, and thereafter turned into the position shown in Fig. 3, the cam-surfaces acting to draw the flanges $b^2$ closely against the top of the base-plate and thereby secure the shell-holder firmly thereto.

The base-plate has a keyhole-slot $d$ at one end to receive therein the foot of an arm $d'$, lateral lugs $d^2$ on the foot of the arm riding on cams $c'$ to retain it in place when passed through the slot $d$ and partly rotated. The outer end of the arm $d'$ is bent to overhang the shell-holder, and its outer end is provided with a hole $d^3$ substantially in alignment with the axis of the shell-holder. A second guide-eye $d^4$ is formed on a projection at the bend of the arm.

When a conical mass of thread or twine, as A, Fig. 1, is to be unwound, its shell $h$ is forced upon the tapering shell-holder B and held thereon by friction, the ribs $b^3$ assisting in holding it firmly thereon and preventing its rotation. The free end $t$ of the thread or twine is led through the hole $d^3$ directly to the point desired, or it may be also passed through the guide-eye $d^4$, a pull upon the end $t$ drawing the thread or twine off from the mass.

By making the tapering shell-holder removable or detachable from the base-plate I am enabled to readily adapt the thread or twine holder to different-sized conical shells, and this is a very valuable feature; for quite a number of different sizes of conical shells are made, some of them differing very considerably in the angle of the conical surface, so that by detaching one shell-holder from the base-plate another may be substituted almost instantly, adapted to hold a different-shaped shell, thus obviating the necessity of having a complete outfit for different-shaped shells or being restricted to shells having a constant angularity.

The top of the shell-holder has formed thereon a hub $e$ to receive loosely thereon a preferably-ribbed and slightly-tapering sleeve $e'$, having an annular base $e^2$, which rests upon the top of the shell-holder. A headed bolt $f$ has its shank extended through the hub $e$, and a nut $f'$ is screwed upon its threaded end, maintaining in place a spiral spring $s$ surrounding the shank between the nut and the top of the shell-holder, while the bolt $f$ is prevented from rotating by a projection $f^\times$ on the under side of its head, fitting loosely in a recess in the end of the hub $e$. By moving the nut $f'$ on the shank the tension of the spring $s$ is regulated and thereby the pressure exerted by the bolt-head upon the sleeve $e'$.

In Fig. 2 a cylindrical mass of thread or twine C is shown, its cylindrical shell $h'$ being forced upon the sleeve $e'$ and held firmly thereon, while the free end $t'$ of the thread or twine is led through a guide-eye $d^5$, (see dotted lines, Fig. 2,) in the arm $d'$, the mass C being retained in place by a removable pin $g$ inserted through the hole $d^3$ loosely into the outer end of the shell $h'$. When the end $t'$ is pulled, the thread or twine is drawn off, the cylindrical mass revolving with the sleeve $e'$ about the hub $e$ of the shell-holder, the friction of the annular base $e^2$ on the top of the shell-holder governing the rotation of the mass and preventing retrograde movement thereof.

It will be obvious from the foregoing that my holder is equally adapted for cylindrical or conical masses of the thread or twine.

The spring $s$ and headed bolt co-operating with the sleeve $e'$ constitute a tension device for the thread or twine when wound in cylindrical masses.

A species of bayonet-joint to connect the shell-holder and base-plate is formed by the ears and flanges on the former co-operating with the openings $a^3$ and $a^4$ of the latter.

When it is desired to adjust the tension of the spring $s$ of the tension device, the shell-holder B is turned part way round until the ears $b'$ come under the openings $a^4$ of the base-plate, whereupon the shell-holder can be removed and the nut rotated in one or the other direction on the bolt $f$. With the detachable shell-holder B the tension may be regulated at any time by a simple removal of the said shell-holder from the base-plate and without taking off the mass of thread or twine held upon the sleeve $e'$. If it were not for this detachability of the shell-holder B, it would be necessary to remove the mass of thread or twine from the sleeve $e'$ in order to adjust the tension.

The main portion of the shell-holder B is not in use when a cylindrical mass is to be unwound, and likewise the tension device is inoperative when a conical mass is placed on the shell-holder.

If it is desired to unwind the thread or twine from a cylindrical mass without rotating the latter, the tension device is adjusted to prevent the rotation of the sleeve and the free end of the twine or thread is led through the hole or eye $d^3$, the pin $g$ being removed.

I claim—

1. A thread or twine holder consisting of a base plate, a detachable tapering shell-holder mounted on said base plate and provided with a hub, a sleeve rotatable on the hub, a headed spring-controlled bolt extended through the hub and adapted to bear upon the sleeve, to regulate its rotation, and an overhanging arm on the base plate provided with guide eyes, substantially as described.

2. A thread or twine holder consisting of a base plate, a detachable shell-holder mounted thereon, a rotatable sleeve on the shell-holder, to receive and hold a cylindrical shell carrying a mass of thread or twine, a tension device to regulate the rotation of the sleeve and the said mass held thereon, an arm on the base plate having an eye in line with the axis of the shell-holder, and a removable pin held in said eye and to enter and support the outer end of the shell, substantially as described.

3. A thread or twine holder consisting of a base plate, a shell-holder detachably mounted thereon and having a tapering body portion to receive and hold a conical shell, a rotatable sleeve on the outer end of the shell-holder to receive and hold a cylindrical shell, a tension device to regulate the rotation of said sleeve and shell held thereon, and an arm on the base plate provided with guide eyes, substantially as described.

In testimony whereof I have signed my name to this specification in the presence of two subscribing witnesses.

GEORGE H. HEDGE.

Witnesses:
FREDERICK W. LUSCOMB,
ALBERT W. LEWIS.